(12) United States Patent
Dale

(10) Patent No.: US 7,711,805 B1
(45) Date of Patent: May 4, 2010

(54) SYSTEM AND METHOD FOR COMMAND TRACKING

(75) Inventor: Stephen G. Dale, Dripping Springs, TX (US)

(73) Assignee: Crossroads Systems, Inc., Austin, TX (US)

( * ) Notice: Subject to any disclaimer, the term of this patent is extended or adjusted under 35 U.S.C. 154(b) by 1005 days.

(21) Appl. No.: 11/021,544

(22) Filed: Dec. 22, 2004

Related U.S. Application Data

(60) Provisional application No. 60/629,719, filed on Nov. 19, 2004.

(51) Int. Cl.
*G06F 15/173* (2006.01)
(52) U.S. Cl. .............. 709/223; 709/200; 709/201; 709/224; 705/26
(58) Field of Classification Search .......... 709/200, 709/201, 223, 224; 705/26
See application file for complete search history.

(56) References Cited

U.S. PATENT DOCUMENTS

| | | | |
|---|---|---|---|
| 7,165,258 B1 | 1/2007 | Kuik et al. | |
| 7,188,194 B1 | 3/2007 | Kuik et al. | |
| 7,240,098 B1 | 7/2007 | Mansee | |
| 7,281,062 B1 | 10/2007 | Kuik et al. | |
| 7,343,524 B2 * | 3/2008 | Klotz et al. | 714/39 |
| 2005/0289013 A1 * | 12/2005 | Goldberg | 705/26 |

* cited by examiner

*Primary Examiner*—Vivek Srivastava
*Assistant Examiner*—Adnan Mirza
(74) *Attorney, Agent, or Firm*—Sprinkle IP Law Group

(57) ABSTRACT

Embodiments of the present invention provide a system and method of command tracking that eliminates, or at least substantially reduces, the shortcomings of prior art systems and methods for command tracking. More particularly, embodiments of the present invention provide a system and method in which a command is assigned a unique identification. State information for the command (e.g., has the command been completed, has all the data associated with the command been received and other state information) can be associated with the unique identification and recorded. According to one embodiment, the state information can be stored in various tables that correspond to particular data transport protocols and/or devices. Because the state information for the command is associated with the unique identification in the tables, state information for the same command can be identified, even if the command changes data transport protocols.

17 Claims, 8 Drawing Sheets

SYSTEM AND METHOD FOR COMMAND TRACKING

RELATED APPLICATIONS

This application claims priority under 35 U.S.C. 119 (e) to U.S. Provisional Application No. 60/629,719, entitled "System and Method for Command Tracking" by Stephen Dale, filed Nov. 19, 2004, which is hereby fully incorporated by reference herein.

TECHNICAL FIELD OF THE INVENTION

Embodiments of the present invention relate to tracking commands. More particularly, embodiments of the present invention relate to tracking the flow of a command across protocol layers.

BACKGROUND OF THE INVENTION

In storage area networks, routers process commands between hosts and target devices. Typically, the hosts are connected to the router by a first data transport medium (e.g., fibre channel transport medium) and the target devices are connected to the hosts by a second data transport medium (e.g., a SCSI transport medium). This presents problems in being able to understand the flow of information through the router as the manner in which information is transported changes. Because the flow of information in the router is not well understood, it is often difficult to assess the cause of an error or other issue, particularly when the issue only manifests itself under heavy loads with data flowing to multiple hosts/devices at a time.

Typically, in prior systems, insufficient information is maintained to track a command through a router. In order to determine the source of an error associated with a command, the conditions under which the error occurred (including hardware, software and load conditions) must be replicated. The router must then be monitored to determine the cause of the error, assuming the error reoccurs in the replicated conditions. Replication of the conditions under which an error occurred can be time consuming and costly.

To the extent that information that can aid in diagnosing errors or other issues associated with commands is maintained, it is typically kept in a chronological log that records each status message as it occurs. When the list becomes too long, the oldest entries in the list are overwritten. In attempting to resolve an issue, a system administrator must typically print out the list to determine when errors occurred. However, it is often difficult to associate status messages with particular commands from such a list or to determine if an error is the result of issues at the host-side or target-side of a device.

SUMMARY OF THE INVENTION

Embodiments of the present invention provide a system and method of command tracking that eliminates, or at least substantially reduces, the shortcomings of prior art systems and methods for command tracking. More particularly, embodiments of the present invention provide a system and method in which a command is assigned a unique identification. State information for the command (e.g., has the command been completed, has all the data associated with the command been received and other state information) can be recorded in a manner that associates it with the unique identification. According to one embodiment, the state information can be stored in various tables that correspond to particular data transport protocols and/or devices. Because the state information for the command is associated with the unique identification in the tables, state information for the same command can be identified even if the command changes data transport protocols.

One embodiment of the present invention includes a method for tracking commands that comprises receiving a command, assigning the command a unique identification and recording state information for the command. The state information is recorded in a manner such that it is associated with the unique identification. According to one embodiment, a first portion of this state information is recorded in a first table corresponding to a first data transport protocol while a second portion of the state information is recorded in a second table that corresponds to a second data transport protocol. The first table can further correspond to a particular host and the second table can correspond to a particular target device.

The state information for the command can be recorded by various protocol layers. Therefore, one embodiment of the method can include, at a first protocol layer corresponding to a first data transport protocol: determining that a message contains a command, assigning the command the unique identification, recording at least a first portion of the state information for the command in a first table, and passing the unique identification and the command to another layer. The method can further comprise, at a second protocol layer corresponding to a second data transport protocol: receiving the unique identification and the command and recording at least a second portion of the state information for the command in a second table.

Another embodiment of the present invention includes a computer program product for tracking commands that comprises a set of computer instructions stored on a computer readable medium. The set of computer instructions comprise instructions executable to assign a command a unique identification and record the state information for the command in a manner that associates the state information with the unique identification.

Yet another embodiment of the present invention includes a routing device that comprises a routing device that has a first controller operable to interface with a first data transport medium, a second controller operable to interface with a second data transport medium, a buffer to provide a memory workspace for the routing device and a processing unit connected to the first controller, the second controller and the buffer. The processing unit is operable to, assign a command a unique identification, associate state information for the command with the unique identification and record the state information for the command. The processing unit can be further operable to record a first portion of the state information in a first table corresponding to a first data transport medium and a second portion of the state information in a second table corresponding to a second data transport medium.

Another embodiment of the present invention includes a computer program product comprising a set of computer instructions stored on a computer readable medium. The computer instructions comprise instructions executable to assign a command received from an initiator a unique identification, record a first portion of state information for the command in a first table corresponding to a first data transport protocol wherein the first portion of the state information is associated with an initiator identification and the unique identification in the first table and record a second portion of the state information for the command in a second table corresponding to the second data transport medium, wherein the second portion of the state information is associated with a target identification and the unique identification in the second table.

Embodiments of the present invention provide an advantage over prior art systems and methods of command tracking by tracking state information for commands on a protocol-by-protocol basis.

Embodiments of the present invention provide another advantage over prior art systems and methods of command tracking by allowing a user to correlate various pieces of state information together using a unique identifier.

Embodiments of the present invention provide another advantage by tracking information on the host and target sides of a routing device. This can allow a user to determine whether an error manifested itself due to issues on the host-side or the target-side of the routing device.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

The small computer system interface ("SCSI") protocol has become a ubiquitous protocol for formatting commands. Versions of the SCSI standard (e.g., SCSI-1, SCSI-2, SCSI-3) define both a command protocol with a set of defined commands ("SCSI commands") and responses, a data transport protocol (the "SCSI transport protocol") for encapsulating the commands and responses, and a SCSI physical interface. SCSI commands can be encapsulated according to a variety of data transport protocols without using the SCSI data transport protocol or SCSI physical interface. Example data transport protocols include fibre channel, serial storage architecture, serial bus protocol, iSCSI, advanced technology attachment ("ATA"), serial ATA ("SATA"), serial attached SCSI ("SAS") and others. Thus, the SCSI standard separates the SCSI physical interface, SCSI command sets and the SCSI data transport protocol.

Embodiments of the present invention provide a system and method for tracking the state of commands, particularly SCSI commands, in a routing device. When a command is received at a routing device, the command can be assigned a unique identification to internally identify the command at the routing device. State information for the command (e.g., has the command been completed, has all the data associated with the command been received and other state information) can then be recorded. When the state information is recorded it can be associated with the unique identifier. This can allow the command to which a particular set of state information belongs to be identified. The state information, according to one embodiment of the present invention, is stored in various tables associated with the data transport protocols supported by the routing device. According to one embodiment of the present invention, there are two tables for each protocol. The first table tracks commands received from devices connected by that protocol and the second table tracks commands sent to devices connected by that protocol. According to another embodiment, tables can be further kept on a device-by-device basis so that for each device connected to a routing device by a particular data transport protocol, say fibre channel, there will be a table to track commands received from that device and a table to track commands sent to that device. Because the state information is associated with the unique identifier in the tables, state information for the same command from the various tables can be correlated. This can aid in resolving issues experienced by the routing device.

Figure 1:
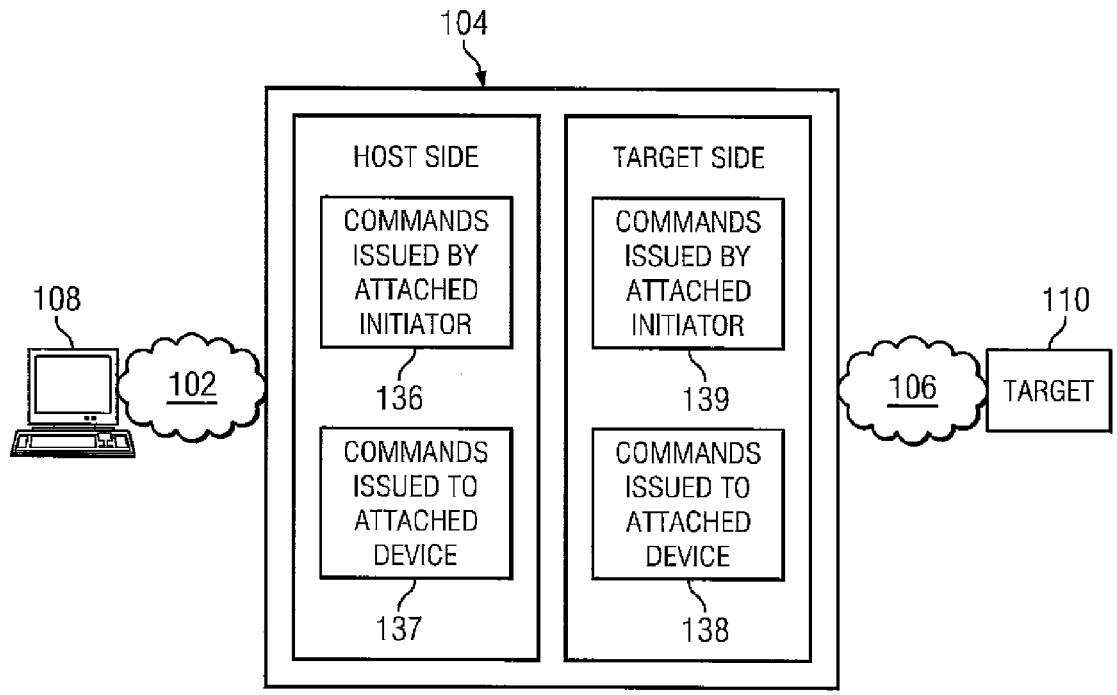
FIG. 1 is a diagrammatic representation of a system in which embodiments of the present invention can be implemented.

FIG. 1 is a diagrammatic representation of a system 100 in which embodiments of the present invention can be implemented. Data communication system 100 can be a storage area network ("SAN"), a network attached storage ("NAS") network or other network. Communication system 100 can include a first data transport medium 102, a routing device 104, and a second data transport medium 106. A host 108 (e.g., any device that can initiate a command such as a host computer) connected to routing device 104 by the first data transport medium 102 can send commands to and receive responses from a target 110 (e.g., any device that can receive and process a command such as a storage device, examples of which include hard disk drives, tapes, RAID systems) connected to routing device 104 by second data transport medium 106. While only one initiator and one target are shown, data communications system 100 can include one or more initiators and one or more targets. First data transport medium 102 and second data transport medium 106 can operate according to any data transport protocol, including SCSI, Fibre Channel, advanced technology attachment ("ATA"), serial ATA ("SATA"), iSCSI, infiniband, parallel SCSI, serial attached SCSI or other data transport protocol known or developed in the art. By way of example, first data transport medium 102 can be a fibre channel transport medium and second data transport medium 106 can be a SCSI data transport medium, such as a SCSI bus.

Continuing with the example in which data transport medium 102 is a fibre channel data transport medium and data transport medium 106 is a SCSI transport medium, routing device 104 can map the initiator/host device to the target(s) according to any address mapping scheme known in the art, including that described in U.S. Pat. No. 6,041,381, entitled "Fibre Channel to SCSI Addressing Method and System," issued Mar. 21, 2000 to Hoese, which is hereby fully incorporated by reference herein and provide access control between host and target devices, such as described in U.S. Pat. No. 5,941,972, entitled "Storage Router and Method for Providing Virtual Local Storage" by Hoese, et al., issued Aug. 24, 1999, U.S. Pat. No. 6,421,753, entitled "Storage Router and Method for Providing Virtual Local Storage" by Hoese, et al., issued Jul. 16, 2002, U.S. Pat. No. 6,425,035, entitled "Storage Router and Method for Providing Virtual Local Storage" by Hoese, et al., issued Jul. 23, 2002, U.S. Pat. No. 6,730,854, entitled "Storage Router and Method for Providing Virtual Local Storage" by Hoese, et al., issued May 18, 2004, U.S. Pat. No. 6,789,752, entitled "Storage Router and Method for Providing Virtual Local Storage" by Hoese, et al., issued Jul. 19, 2004, U.S. Pat. No. 6,763,419 entitled "Storage Router and Method for Providing Virtual Local Storage" by Hoese, et al., issued Sep. 7, 2004, U.S. patent application Ser. No. 10/658,163, filed Sep. 9, 2003, entitled "Storage Router and Method for Providing Virtual Local Storage" by Hoese, et al., each of which is hereby fully incorporated by reference herein.

Routing device 104 can include any network device known in the art, including storage routers, bridges, gateways or other device capable of routing data. Exemplary embodiments of routing devices include the Crossroads 6,000 and 10,000 Storage Routers by Crossroads Systems, Inc., of Austin Tex. Routing device 104 can include a first interface to connect to first data transport network 102 and a second interface to connect to second data transport medium 106. A processing unit can include a processor and a computer readable medium (RAM, ROM, magnetic storage and/or other computer readable medium known in the art) storing a set of computer instructions (the "tracking program"). The processing unit can access memory that provides a memory workspace for the processing unit. One embodiment of a routing device is described in greater detail in conjunction with FIGS. 2A and 2B.

According to one embodiment of the present invention, routing device 104 can receive commands from host 108. The commands can include SCSI commands encapsulated according to a data transport protocol such as a fibre channel protocol or other data transport protocol. When a command is received from host 108, the tracking program can assign the command a unique identifier. The identifier can be arbitrarily derived, for example, from the data transport protocol used to transport the command (fibre channel, SCSI, iSCSI), a port number and an overall counter. The unique identifier, according to one embodiment, can be a thirty-two bit number. Routing device 104 can track the state of the command using the unique identifier for that command.

Commands, according to one embodiment of the present invention, can be tracked on a data transport protocol basis, so that for each data transport protocol, commands that are received from devices on that data transport protocol and commands sent to devices on that data transport protocol can be identified. The state information for the commands can be kept in one or more tables, with each table corresponding with a data transport protocol. In the example of the fibre channel-to-SCSI router, for example, there can be a host-side table 136 and a host-side table 137 to track commands received from hosts and sent to hosts, respectively, on the fibre channel data transport medium. There can also be a target-side table 138 and a target-side table 139 to respectively track commands sent to devices or received from devices on the SCSI data transport medium. In this case host-side table 136 and host-side table 137 correspond to the fibre channel data transport protocol, while target-side table 138 and target-side table 139 correspond to the SCSI data transport medium.

According to one embodiment of the present invention, host-side table 136 and host-side table 137 can be indexed by the host from which a command is received or to which a command is sent and the target-side table 138 and target side table 139 can be indexed by the target to which each command is sent or from which a command is received. Thus, each table provides a list of devices, commands sent to or received from those devices and any information recorded for the commands. Because each command is assigned a unique identifier, state information for the same command can be located in the various tables. According to another embodiment, the tables can be kept on a device-by-device basis. In this case, host-side table 136 and host-side table 137 may only include information related to commands sent to or received from host 108. Additional tables would be created to track commands sent to or received from other hosts.

According to one embodiment, each table can be stored using a circular buffer. When the memory allocated to a table is exceeded, the last entries in the table can be overwritten. For example, the information associated with each host device stored in host-side table 136 and the information associated with each target device stored in target-side table 138 can be stored in a circular buffer such that when the memory allocated for a particular device is exceeded, the oldest entries in the table for that device are overwritten. Thus, if one host sends a large number of commands to routing device 104 and the memory required to store information associated with that host in host-side table 136 is exceeded, only information associated with that host will be overwritten with new information for that host. The information associated with other hosts will not be affected.

The host-side and target-side information recorded for each command can be a matter of implementation. According to one embodiment of the present invention, the information recorded will indicate a change in state or status of the command at each side. For example, if a WRITE command is received from host 108, the WRITE command can be assigned a unique identifier and can be indexed in host-side table 136 under host 108. For the WRITE command, the fact that the command was received, the time that the command was received and other information associated with WRITE command can be stored. On the target side, the WRITE command can be indexed according to the target device in target-side table 138 and information associated for the WRITE command, such as the fact that the WRITE command was sent to target 110, the time the command was sent and other information.

Continuing with the previous example, when routing device 104 receives a "transfer ready" message from target 110, routing device 104 can record the fact that a transfer ready was received and the time the transfer ready was received in target-side table 138 for the WRITE command. If routing device 104 sends a transfer ready message to host 108 for the WRITE command, routing device 104 can record information for the transfer ready message in host-side table 136 for the WRITE command. If routing device 104 must await the transfer of data associated with the WRITE command from host 108, routing device 104 can record, for example, an "awaiting data" status for the command in host-side table 136. As data arrives from host 108 for the WRITE command, routing device 104 can record this fact in host-side table 136 for the WRITE command. As routing device 104 sends the data to target 110, this fact can also be recorded for the WRITE command in target-side table 138. If target 110 sends a SCSI Status=good message in response to receiving data from routing device 104, routing device 104 can record the status=good for the WRITE command in target-side table 138. If routing device 104 forwards a SCSI Status=good message to host 108, this fact can be recorded for the WRITE command in host-side table 136.

According to another embodiment of the present invention, for a WRITE command, the information that can be recorded can include receipt of the command, receipt of the data to write, command sent to the target, data sent to the target and command completion. Other commands have similar common state changes that can be recorded.

Thus, for a command that is passed through routing device 104, routing device 104 can receive the command, assign the command a unique identification and record state information for the command. The state information for the command can be associated with the unique identification so that state information corresponding to the same command can be identified. The state information for the command can be stored in multiple tables. For example, a first portion of the state information (e.g., state information related to the host-side of routing device 104) can be recorded in a first table corresponding to the first data transport protocol and a second portion of the state information (e.g., state information related to the target-side of routing device 104) can be recorded in a second table corresponding to the second data transport protocol. The first table can further correspond to a particular host device while the second table can further correspond to a particular target device.

Figure 2A:
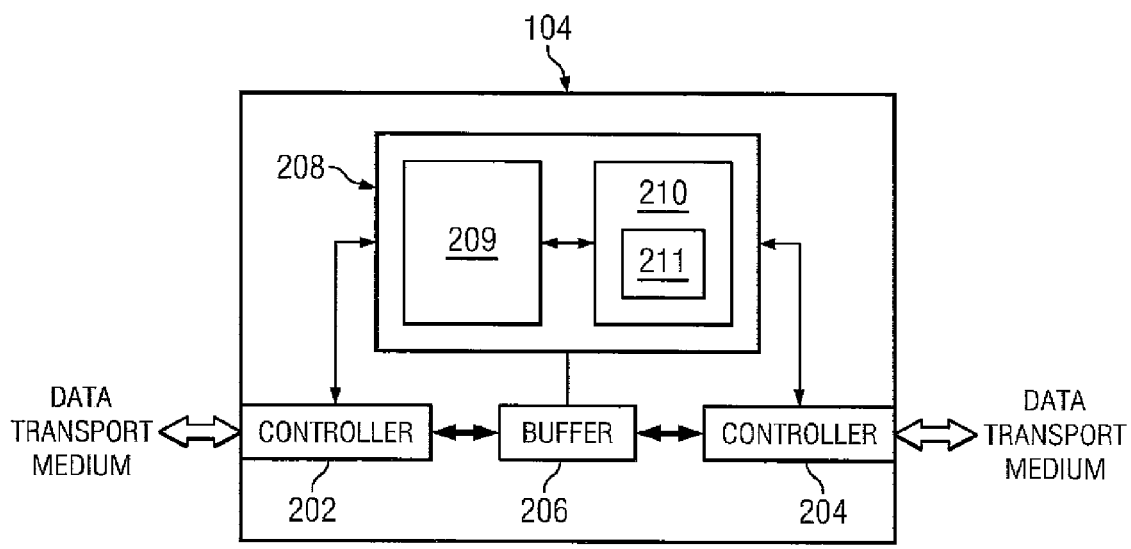
FIGS. 2A and 2B are diagrammatic representations of a routing device according to the present invention.

FIG. 2A is a diagrammatic representation of one embodiment of a routing device 204 in which command processing according embodiments of the present invention can be implemented. The routing device can comprise a first transport medium controller 202 that interfaces with a first transport medium and a second transport medium controller that interfaces with a second transport medium 104. In one embodiment of the present invention, the first transport medium can be a Fibre Channel transport medium, the second transport medium a SCSI bus, controller 202 a Fibre Channel controller, such as a fibre channel controller based on the TACHYON family of fibre channel control chips and controller 204 a SCSI controller. TACHYON fibre channel control chips are a product Agilent Technologies, Inc. of Palo Alto, Calif. Various forms of the Tachyon fibre channel control chip can be used including, but not limited to, the TL or Tachlite (HPFC-5100), the XL2 (HPFC-5200x, where x is the Rev A, B, C, etc.), the DX2 (HPFC-5400x, where x is the Rev A, B, C, etc.), the DX4 (HPFC-5700x, where x is the Rev A, B, C, etc.).

In other embodiments of the present invention the first and second transport media (and respective controllers) can be: Fibre Channel and Fibre Channel; SCSI and SCSI; iSCSI and iSCSI; Fibre Channel and iSCSI; iSCSI and Fibre Channel; iSCSI and SCSI; SCSI and iSCSI; Fibre Channel and Infiniband; Infiniband and Fibre Channel; iSCSI and ATA; ATA and iSCSI; iSCSI and SATA; Serial ATA and iSCSI; Fibre Channel and Serial Attached SCSI; Serial Attached SCSI and Fibre Channel; iSCSI and Serial Attached SCSI; Serial Attached SCSI and iSCSI; Fibre Channel and ATA; ATA and Fibre Channel; Fibre Channel and SATA; SATA and Fibre Channel; Fibre Channel and Serial SCSI Architecture; Serial SCSI Architecture and Fibre Channel; Infiniband and Serial Attached SCSI; Serial Attached SCSI and Infiniband. Each transport medium, regardless of the data transport protocol by which it operates, can carry SCSI commands.

A buffer 206 provides memory work space and is connected to both controller 202 and to controller 204. A processing unit 208 is connected to controller 202, controller 204 and buffer 206. According to one embodiment of the present invention, processing unit 208 comprises one or more processors 209 for controlling operation of the storage router, handling address mapping and security access and converting commands between protocols and a computer readable medium 210 accessible by the processor storing a set of computer instructions 211 that are executable by the processor. According to other embodiments of the present invention buffer 206 and/or computer readable medium 211 can be onboard processor 210.

In one implementation (not shown), the storage router can be a rack mount or free standing device with an internal power supply. The routing device can have a Fibre Channel and SCSI port, and a standard, detachable power cord can be used, the FC connector can be an optical Small Form Factor ("SFF") connector, and the SCSI connector can be a VHDCI type. Additional modular jacks can be provided for a serial port and an 802.3 10BaseT port, i.e. twisted pair Ethernet, for management access. The SCSI port of the storage router can support SCSI direct and sequential access target devices and can support SCSI initiators, as well. The Fibre Channel port can interface to SCSI-3 FCP enabled devices and initiators or other Fibre Channel devices.

To accomplish its functionality, one implementation of the routing device uses: a Fibre Channel interface based on the Agilent XL2 2 Gb/s Fibre Channel controller and an optical SFF transceiver; a PMCS RM7000A processor, incorporating independent data and program memory spaces, and associated logic required to implement a stand alone processing system; and a serial port for debug and system configuration. Further, this implementation includes a SCSI interface supporting Ultra-2 based on the SYMBIOS 53C8xx series SCSI controllers, and an operating system based upon the WIND RIVERS SYSTEMS VXWORKS kernel. In addition, the routing device can include software as required to control functions of the various elements, track commands, generate commands and provide appropriate translations between the FC and SCSI data transport protocols.

Figure 2B:
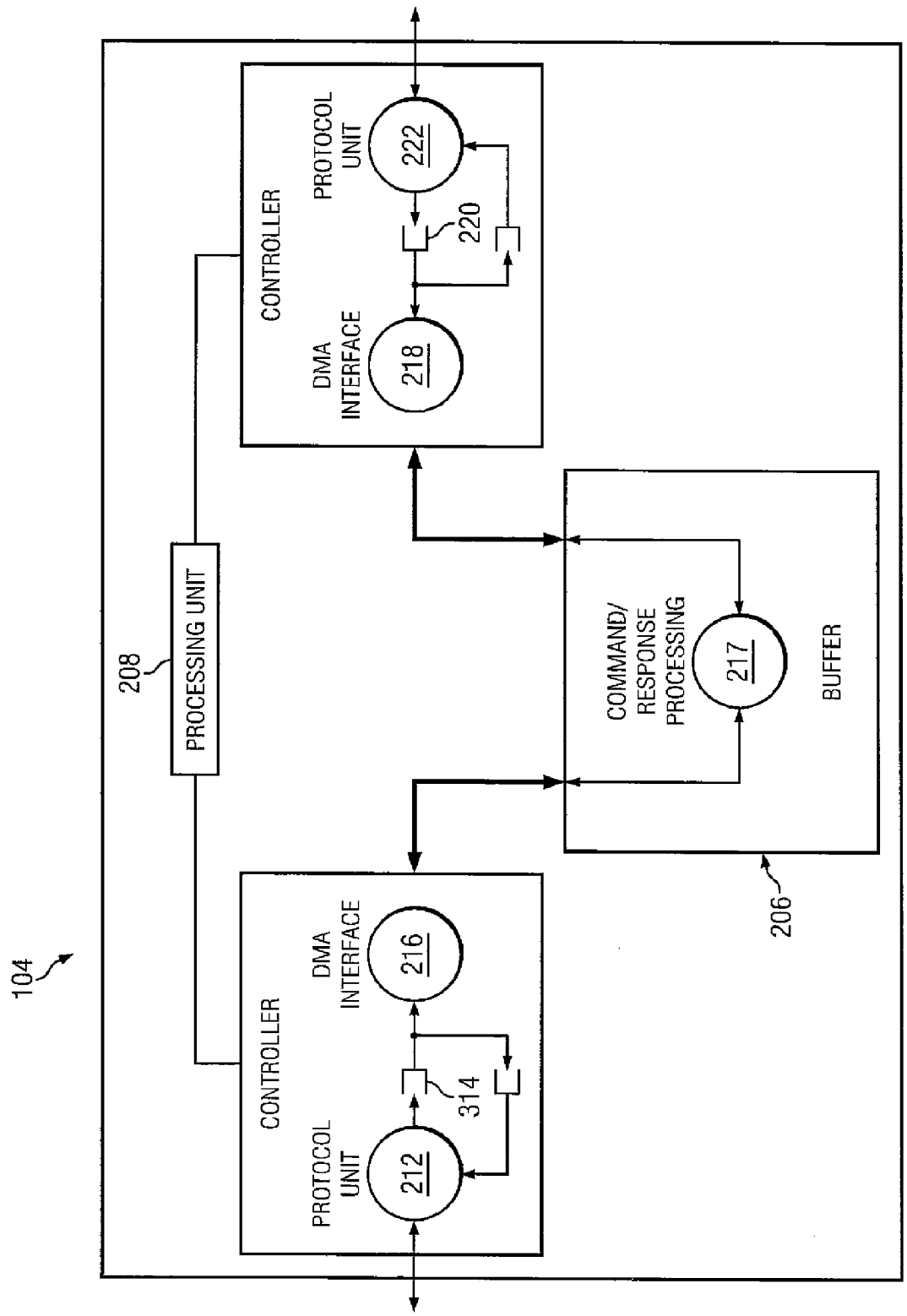

FIG. 2B is a block diagram of one embodiment of data flow within the storage router of FIG. 2A. As shown, data from the first transport medium (e.g., the Fibre Channel transport medium) is processed by a protocol unit 212 (e.g., a Fibre Channel protocol unit) and placed in a FIFO queue 214. A direct memory access (DMA) interface 216 then takes data out of FIFO queue 214 and places it in buffer 306.

Processing unit 208 processes the data in buffer 206 as represented by supervisor processing 217. This processing can include mapping between the first data transport protocol and the second data transport protocol, tracking commands and applying access controls and routing functions. A DMA interface 218 then pulls data from buffer 206 and places it into a buffer 220. A second protocol unit 222 pulls data from buffer 220 and communicates the data on the second transport medium (e.g., the SCSI bus). Data flow in the reverse direction, from the second data transport medium to the first data transport medium, can be accomplished in a reverse manner. Processing unit 208 can be operable to execute a tracking program that can assign commands arriving at routing device 104 a unique identification and record status information for the commands for each data transport protocol.

It should be noted that while the tracking program, in the above example, is discussed as a single program, the tracking program can be code that is distributed among the various programs utilized by the routing device. Using the example of a fibre channel-to-SCSI router, some portions of the tracking program may be implemented as part of the software drivers for the fibre channel interface while other portions of the tracking portion may be implemented as part of the software drivers for the SCSI interface. Thus, it should be understood that the functionality of the tracking program can be implemented according to any suitable software architecture.

Figure 3:
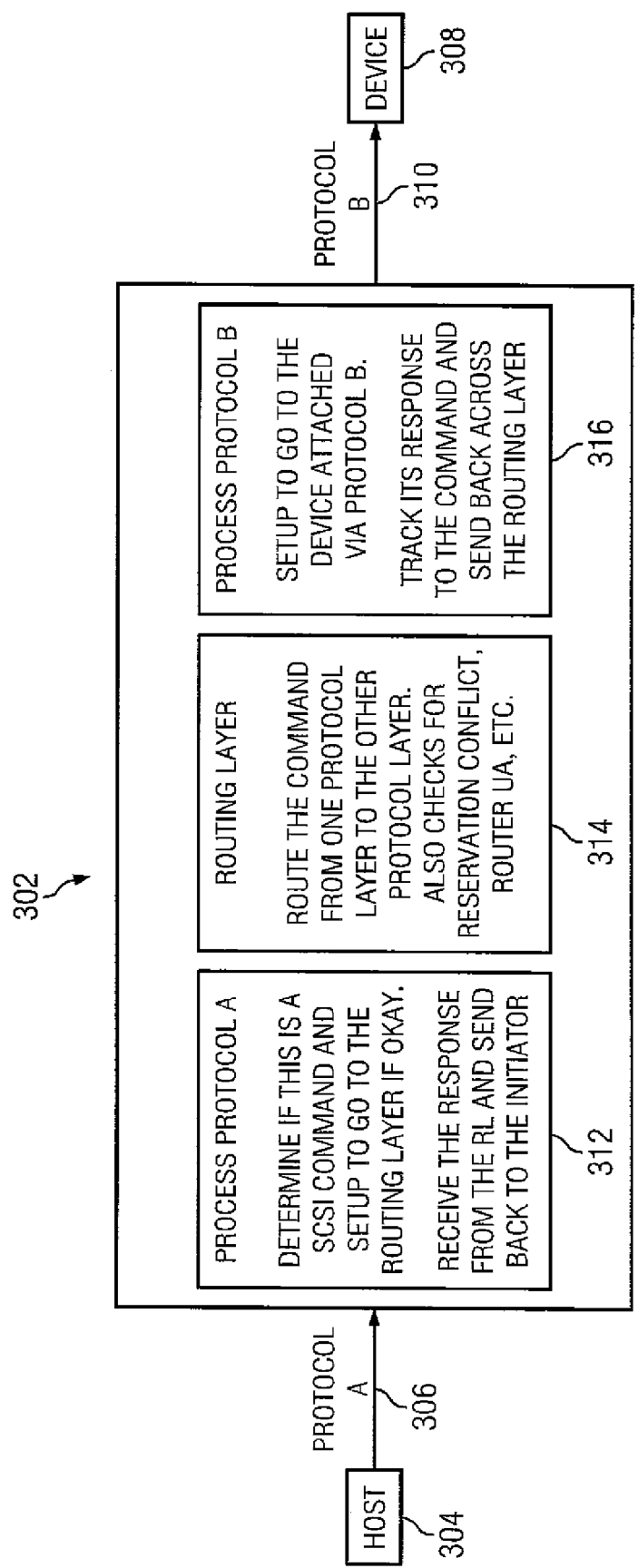
FIG. 3 is a data flow diagram illustrating how commands move through one embodiment of a routing device.
Figure 3B:
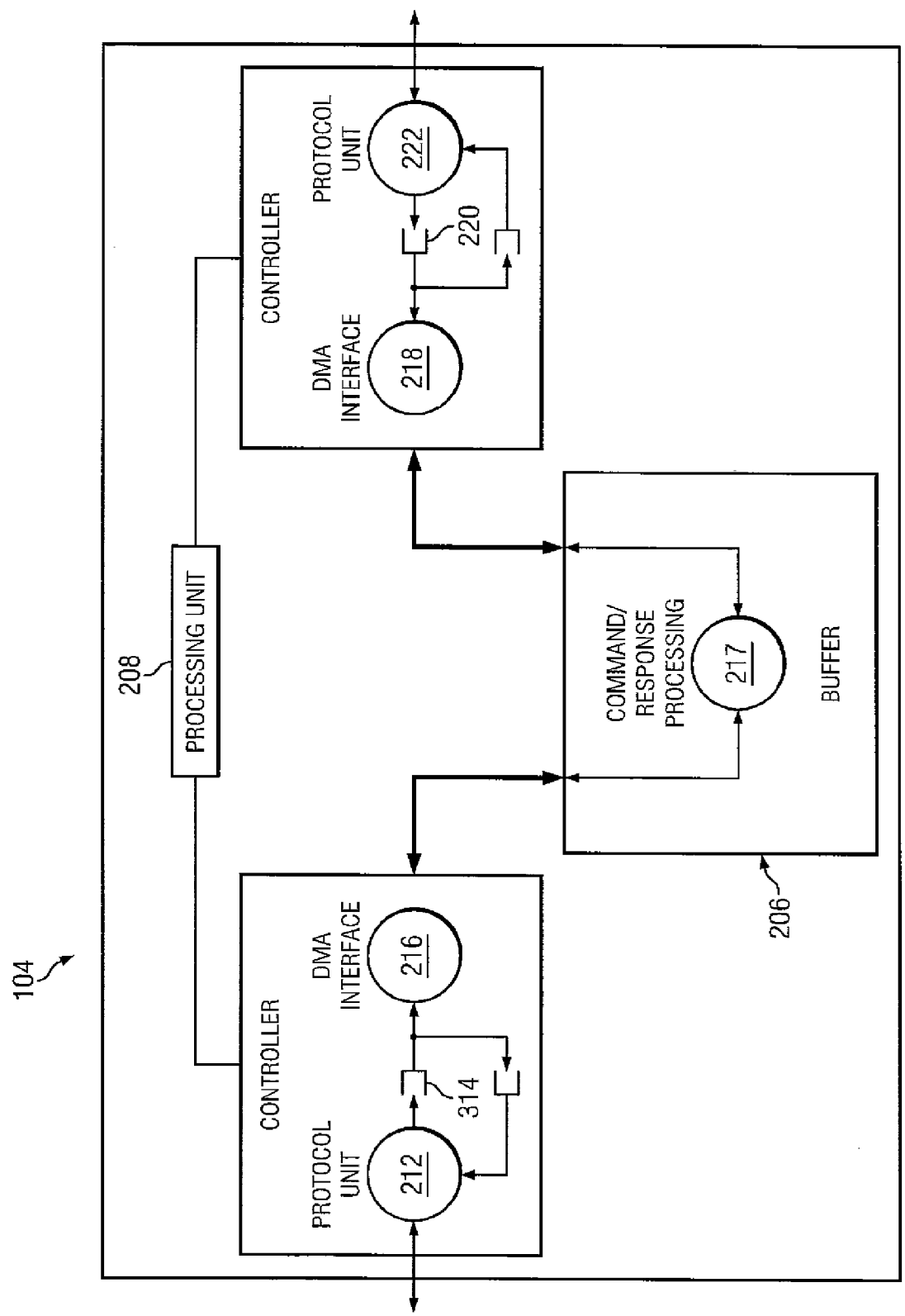

FIG. 3 is a data flow diagram illustrating how commands move through one embodiment of a routing device. For explanatory purposes, the example of a SCSI command is used. In the embodiment of FIG. 3, a routing device 302 receives a command from a host 304 via a first data transport medium 306 and communicates the command to a target device 308 via a second data transport medium 310. Routing device 302, in this example, can include three processing layers, first protocol layer 312, routing layer 314 and second protocol layer 316. Each protocol layer is essentially the application layer for the data transport protocol that can include software drivers for the data transport medium interface and other applications that handle protocol specific processing. For example, if the target device 308 communicates with the routing device 302 via a SCSI data transport protocol, SCSI protocol layer 314 would be the portion of code at routing device 302 that handles issues specific to the SCSI data transport protocol. Similarly, if host 304 communicates with routing device 302 using a fibre channel data transport protocol, the fibre channel protocol layer 312 is the portion of code at routing device 302 that acts as a fibre channel application capable of processing information received via a fibre channel connection. The protocol layers (e.g., the application layer for each protocol) can rely on lower layers in the protocol stack for communicating information and other processes as would be understood by those of ordinary skill in the art. For example, fibre channel protocol layer 312 can rely on FC-0 through FC-4 for sending and receiving data via fibre channel transport medium 306. Routing layer 314 is the portion of code that handles routing data and access controls at the routing device between the protocol layers.

First data transport medium 306 and second data transport medium 310 can operate according to the same or different data transport protocols. When routing device 302 receives the command, the routing device determines, at first protocol layer 312, if there is a SCSI command and, if so, can pass the SCSI command to the routing layer 314 for further processing. The routing device, at routing layer 314, can route the command from one data transport protocol to another data transport protocol. For example, the routing device can map a command received from a fibre channel host to a SCSI target device. It can also check for reservation conflicts, unit attentions and other issues that may affect passing the command to device 308. Finally, routing device 302, at second protocol layer 316, can send the command to device 308 via the second data transport medium.

In the reverse direction, routing device 302 can receive a response to the command (e.g., at protocol layer 316), route the response from the data transport protocol supported by target device 308 to the data transport protocol supported by the host (e.g., can map a response sent according to a SCSI data transport protocol to a fibre channel response) (e.g., at routing layer 314) and can send the response back to the host (e.g., at protocol layer 312).

Thus, in the example of FIG. 3, a SCSI command is issued from host 304 to target device 308. The data transport protocol used to transmit the command and the data transport protocol by which target device 308 communicates with routing device 302 may be the same or different. Routing layer 314 handles transmission of information across protocol layers (e.g., between protocol layer 312 and protocol layer 316). In addition, routing layer 314 can check for router events that will prevent the completion of the command such as reservation conflicts, unit attentions and other events.

As a command and its responses are processed by the host, routing device or target device, the state of the command changes. These state changes can be recorded. If, for example, a WRITE command is received, the state information can include receipt of the command, a request for the data to write, receipt of the data to write, command sent to target device 308 and command completion. Other SCSI commands have similar common state changes that are understood by those of skill in the art. According to one embodiment of the present invention, routing device 302 can record the state change information for a command on a protocol-by-protocol basis. Thus, for each data transport protocol, the state information can be tracked to determine what happens to commands that are received from initiators attached via that data transport protocol and to commands addressed to devices attached by that data transport protocol.

Figure 4:
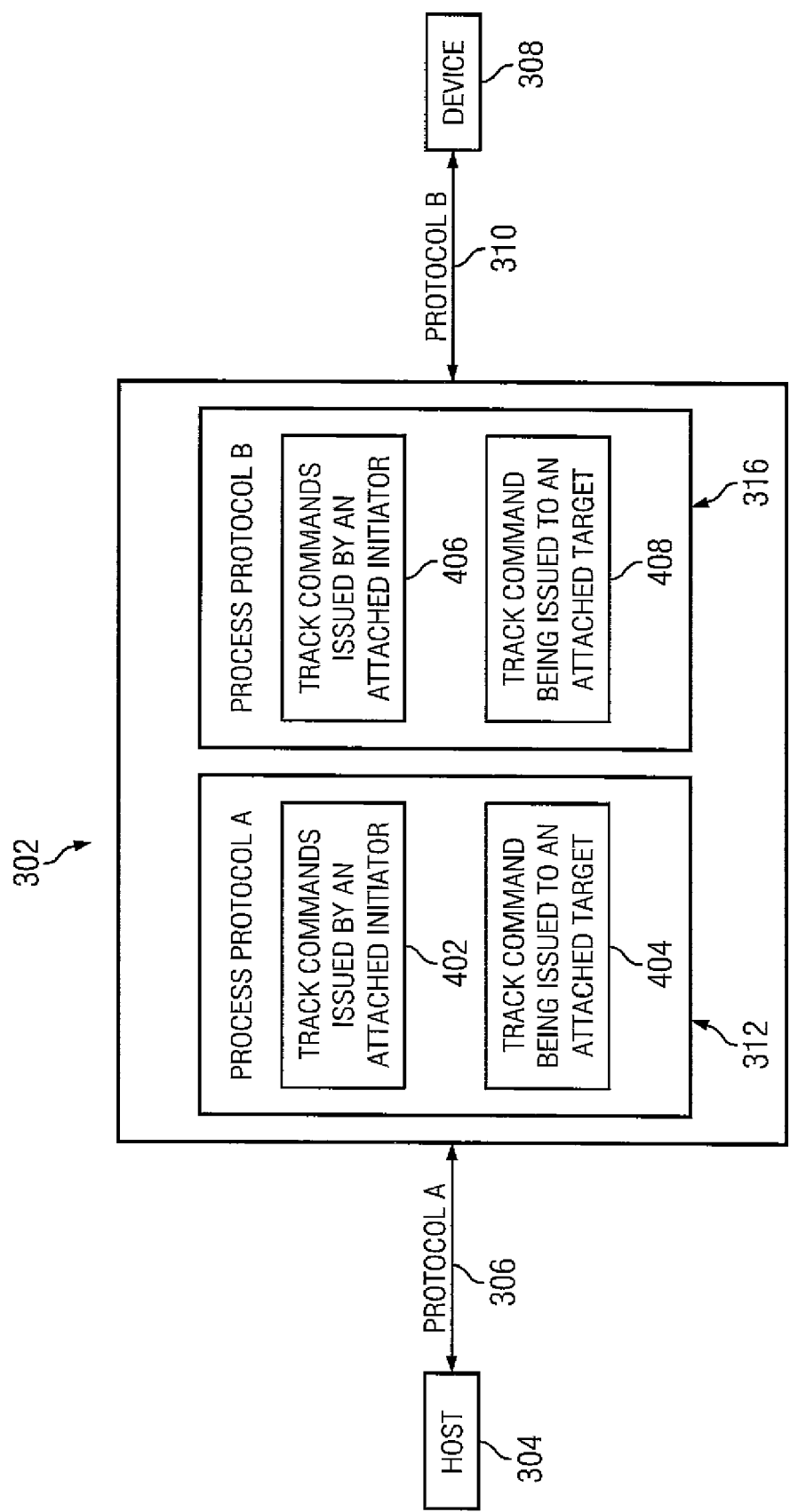
FIG. 4 is a data flow diagram illustrating one embodiment of command tracking.

FIG. 4 illustrates one embodiment of tracking commands by protocol.

Again, for explanatory purposes, the example of tracking SCSI commands is used. When information received by routing device 302 from host 304 is determined to include a SCSI command, a unique identifier for the SCSI command is generated. The unique identifier (Unique ID) can be used to track a command through processing by routing device 302. This Unique ID is generated based, for example, on the protocol, port and a counter. The counter is maintained by the tracking program and increments across a 24-bit value for each call to the routine:

u32 getUniqueID(u8 protocol, u8 port)

The Unique ID is used to track the command and will be passed through the system, from protocol layer to protocol layer within the protocol specific structures. For example, in the case of a fibre channel-to-SCSI router, the Unique ID value can be entered into the fcp_cmd structure in protocol layer 312, passed across the routing layer (e.g., routing layer 314, not shown for simplicity) using remote method invocation ("RMI") (e.g., can be passed to routing layer 314 using an RMI Packet) and then inserted into the pTask on the SCSI side by protocol layer 316. In this manner, the same Unique ID can be used for tracking the SCSI command on the fibre channel side of the routing device and the SCSI side of the routing device. Typically, the getUniqueID routine would only need to be called by routing device 302 when first receiving a command from the initiator. The same Unique ID can then be used at both the initiator and target side of routing device 302. However, in the case of some of the internal routing device commands, it may be clearer to only track the command for the host or target device to which the command is sent. In this case the Unique ID can be requested just before recording the sending of a router generated command to host 304 or target device 308.

When a Unique ID is assigned to a command the command can be tracked throughout routing device 302. Tracking can be performed for example through the use of multiple tables. In the embodiment of FIG. 4, four tables are illustrated, a first protocol table for tracking commands issued by an attached initiator (table 402) connected to routing device 302, a first protocol table for tracking commands sent to an attached device (table 404), a second protocol table to track commands issued by an initiator (table 406) and a second protocol table to track commands received from an attached device (table 408). Tables 402 and 404 thus respectively track commands received from and sent to devices attached to routing device 302 via first data transport medium 306 while tables 406 and 408 respectively track commands received from and sent to devices attached to routing device 302 via second data transport medium 310. It should be noted that a particular table can store commands associated with multiple devices or may correspond to a specific device. Thus, for example, table 402 can store command tracking information for all hosts attached to routing device 302 via data transport medium 306 or may be specific to host 304.

According to the embodiment of FIG. 4, the tables for each data transport protocol are maintained by the corresponding protocol layer; protocol layer 312 maintains table 402 and table 404 while protocol layer 316 maintains table 406 and table 408. Each table can include information that indicates changes in the state of a command. State changes for a command are recorded in the appropriate table to indicate the state of a command has changed. Along with the change in state, ancillary data such as system time, SCSI status, sense data, msgOutbytes, amount of data received and other data related to commands and system information can be recorded. The tables can be constructed in a manner that allows for quick access. For example, protocol layer 312 can index table 402 using the active initiator identification (e.g., s_id for fibre channel) and protocol layer 316 can index table 408 use a target identification (e.g., bus and target ID for SCSI or target IP address for iSCSI).

Protocol table 402, for example, can include state information related to commands that are received via first data transport medium 306. The information in the tables can be updated by the protocol layer that maintains the table. For state changes generated at the routing device, routing layer 314 can pass state change information to the appropriate protocol layer and that protocol layer can update the appropriate table entry. Examples of state information that can be generated at routing device 302 include busy/queue full, reservation conflict, unit attention and other state change information known in the art.

As an example of recording state change information, if a WRITE command is received from host 304 destined for target device 308, protocol layer 312 can assign the command a Unique ID and record the receipt of the WRITE command in table 402. The receipt of the command is a change in state as, previously, the command had not been received. In addition to the fact that the command was received, system information, such as system time can be recorded in table 402. Protocol layer 312 can pass the command and Unique ID to routing layer 314. Routing layer 314 can map WRITE command to the appropriate target device using, for example, fibre channel-to-SCSI addressing techniques known in the art. If routing device 302 is aware of a unit attention at target device 308, a persistent key reservation at target device 308 for another host, or other state that would affect processing of the WRITE command, routing layer 314 can pass this information along with the Unique ID back to protocol layer 312 and protocol layer 312 can update the entry for the WRITE command in table 402 to reflect the change in state (i.e., to reflect the fact that the command could not be completed because of the unit attention or persistent key reservation). If the WRITE command can be sent to target device 308, routing layer 314 can pass the command and Unique ID to protocol layer 316 which can forward the command to target device 308 on the second data transport medium. Protocol layer 316 can record the fact that the command was sent to target device 308 in table 408.

As the state of the WRITE command changes or additional state information is generated, the state information can be recorded in the appropriate table. For example, protocol layer 312 can record in table 402 state information indicating that routing device 302 sent request for data corresponding to the WRITE to host 304, state information indicating receipt of the data from host 304 and state information indicating that routing device 302 forwarded a command complete message to host 304. Protocol layer 316 can record in table 408 state information indicating when routing device 302 sends data corresponding to the WRITE command to target device 308 and state information indicating when routing device 302 receives the command complete from target device 308. The state information recorded for each command can be a matter of implementation. For example, in the case of a WRITE command, additional state information can be recorded such as the receipt of transfer ready messages from target device 304 and other state information.

Table 1 provides an example of various parameters that can be entered to record state information for a command.

TABLE 1

| Parameter | Description |
|---|---|
| U32 uniqueID | Unique identification assigned to the command. |
| U32 targetLun | Lun to which command is directed. This can be a fibre channel LUN for fibre channel devices or a bus/target/LUN for SCSI devices. |
| u32 hostID | Identification of host that sent the command. |
| u32 msgOut | Indication of message out. |
| u8 cdb[16] | Command descriptor block of the SCSI command being tracked. |
| u8 state | State of the command. Example states are described in Table 2. |
| u8 flags | Includes a flag if the command is handled by the routing device. |
| u32 response | Includes responses to the command sent to the host such as SCSI status messages, sense key/ASC/ASCQ and other response messages. |
| u32 origSysTime | Date and time of entry of command to routing device |
| u32 systemTime | Date and time of last update for the command. |
| u32 subState | Substates for a given state. A listing of example SCSI substates and fibre channel substates is provided below. |

The parameters provided in Table 1 are provided by way of example and other parameters can be stored for each command. Table 2 includes an example list of states that can be tracked for a command.

TABLE 2

| Parameter | Description |
|---|---|
| DCS_RCVD = 1, | Command just received. |
| DCS_RCVD_PHASE | SCSI cmd substate change. |
| DCS_WAIT_DATA, | Routing device to get data from host. |
| DCS_BLOCKED | Set to forward command, but target device busy. |
| DCS_GOTDATA_AWAIT, | Routing devices has received all the data, waiting to go to next state. |
| DCS_GOTSOMEDATA | Routing device has received some but not all of the data. |
| DCS_ISSUED | Command issued to target device via RMI or driver. |
| DCS_ISSUED_PHASE | Command at target drive and SCSI substate change. |
| DCS_DONE_INTERNAL | Command completed by router, not device. |
| DCS_DONE | Command completed by target device. |
| DCS_NOTSURE | Possible spoof state. |

The states of table 2 provide examples of states that can exist at a target drive and are not limiting of the present invention. It should be understood that other states and information can be recorded for a command.

As described above, when a command is received from an initiator, routing device 302 creates an entry for that initiator in the appropriate table. For example, if routing device receives a command from host 304, routing device 302 can create a table entry for the command in table 402. This can be done, for example, by calling a AddCmdInfoElt routine. If a table does not exist into which information for host 304 can be entered, the AddCmdInfoElt routine can create a table. An example call for the AddCmdInfoElt routine is:

void AddCmdInfoElt(u32 UniqueID, u32 route, u32 initiatorID, u32 targetLun, u8 *cdb)

This routine will create a new entry for the command just received using the UniqueID for tracking the command through the system. Besides the UniqueID, the input parameters for one embodiment of the present invention are: route, initiatorID, targetLun, and CDB. These are stored in a new entry in the appropriate initiator table. The routine can add the origination systemTime for when the entry was received and set the state indicating the command was received. The route can be used during the display process (described below) to obtain information about the initiator to help the user understand where the command originated.

Whenever routing device 302 detects a state change for the command, the state information for the command can be updated by the appropriate protocol layer. For example, when routing device 302 determines that it has received all the data associated with a WRITE command from host 304, protocol layer 312 can update the state information for the WRITE command in table 402 indicating that it got all the data and is waiting to further process the command. Updating the state information for a command can be done using, for example, an UpdateCmdInfoElt routine:

void UpdateCmdInfoElt(u32 UniqueID, u32 initID, u8 state, u32 value)

This routine will update the systemTime to the current time. The state will be changed to reflect the changed state. Finally, the msgOut, response or subState may be updated, depending on the state change entered. Each of these, according to one embodiment, is a 32-bit value that can be passed to the routine as the "u32 value".

Similarly, for each target device, routing device 302 can record state information for commands that were sent to that target device. For example, if routing device 302 forwards the WRITE command of the previous example to target device 308, routing device 302 can make a table entry for the WRITE command in table 410. For each command, state information indicating what happened to the command (e.g., did it complete normally, was all the data transferred or other state information) can be recorded.

Whenever it is detected that a command is to go to a device, the appropriate protocol layer can create an entry for the command. This can be done, for example, by calling an AddDevInfoElt routine. If there is not yet a table into which information for the target device can be entered, the AddDevInfo routine can create one. An example call for the AddDevInfoElt routine is:

void AddDevInfoElt(u32 UniqueID, u32 route, u32 targetLun, u8*cdb)

This routine will create a new entry for the SCSI command. The input parameters, according to one embodiment, are: UniqueID, route, targetLun, and CDB. These are stored into a new entry in the appropriate table. The routine will add the origination systemTime for when the entry was received and set the state to indicate that the command has been sent. The protocol layer sending the command to the target device (e.g., protocol layer 316) may not know the initiatorID as this information may not be passed from the protocol layer that received the command from the host (e.g., protocol layer 312) across routing layer 314. However, because the UniqueID is used, state information for the same command can be located in the host-side tables and the target-side tables.

Whenever a state change for an existing command that has been sent to a target device is detected, the routing device can update the table entry for the command (e.g., the table entry in table 410) by calling, for example, an UpdateDevInfoElt routine. One example of a call to the UpdateDevInfoElt routine is:

void UpdateDevInfoElt(u32 UniqueID, u32 targetLun, u8 state, u32 value)

This routine will update the systemTime to the current time. The state will be changed to reflect the changed state of the command. Finally, the msgOut, response or subState may be updated, depending on the state change entered. Each of these can be a 32-bit value that can be passed to the routine in the fourth parameter.

In addition to tracking commands received from initiators and passed to target devices, routing device 302 can generate commands or handle commands internally. These commands can also be tracked. For example, if routing device 302 handles a command received from host 304, the fact that the command was handled by routing device 302 can be entered in the state information for the command in table 402. Similarly, if routing device 302 generates a command that is sent to target device 308, state information for the command can be entered in table 408. Routing device 302 can additionally track other information that may be helpful in diagnosing error conditions. For example, routing device 302 can track whether the initiator (e.g., host 304) performed any error recovery or sent tracking messages.

Additionally, embodiments of the present invention can track task management commands. Although task management commands are valid SCSI commands that can be tracked, they are not received in quite the same fashion and as such may require special handling to capture and display their occurrences. One way to do this is to use a "fake" CDB to record the task management command, since there isn't a real CDB that is transmitted with a task management command. This can be used for both the tracking and display to allow the user to see the non-standard command and see how it may have affected the operation in progress.

Information can also be recorded to tell the current state of a spoofed write (such as sent response not to drive yet, got data and started at drive and response sent, etc), as well as information to determine what happened to commands that were at a target drive and were to be terminated early (e.g., ABTS received but the command was completed at the drive anyway).

In addition to the commands, many other messages may flow across a data transport medium. While this information can data transport protocol specific, it can be useful for determining how far a command has progressed. Also, this information can reflect changes in the state of a command. This sub-state data can be tracked at the driver layer for each protocol layer and can be recorded in the table entry for the initiator or target device, if it is identifiable as being that specific, or elsewhere in the tables. This data, according to one embodiment of the present invention, can be correlated with the other command information when a display request is received from a user.

The sub-state information can be added to the appropriate table using the routines described above. Most of the SCSI protocol low-level states will directly affect one command and will be placed into the proper entry. A few, like a Bus Reset, affect all commands on that port. However, most of the FC low-level states are link service commands, which typically affect the state of the FC link and so most of the commands received or sent over particular ports. A few, like a REC, will affect a particular command, and the appropriate table entry can be updated. Those that affect multiple commands will be entered, according to one embodiment, as new commands using a targetLun of −1. This will allow the display software to mark these as potentially affecting multiple commands.

Below is a sample list of low level or sub-states for the SCSI data transport protocol that can be recorded:

DS_INTFLY=1,
DS_RESTORE_TAG,
DS_RESTORE_NO_TAG,
DS_RESTORE_PTR,
DS_NEED_MORE_SG,
DS_CHIP_HALT,
DS_SDTR,
DS_WDTR,
DS_PHASE_MISMATCH,
DS_UDC,
DS_STO,
DS_GROSS_ERROR,
DS_IGNORE_WIDE,
DS_CAC,
DS_MSG_REJECT,
DS_LINK,
DS_UNEXPECTED,
DS_BAD_DMA,
DS_BUS_RESET,
DS_HTH,
DS_PARITY,
DS_OTHER,
DS_RPTLUNS,
DS_LUNREL,
DS_API,
DS_RESREL,
DS_CACHE,
DS_SENSE,
DS_MAX

For the Fibre Channel protocol, the low level states can arise from the BLS and ELS commands as would be understood by those in the art. Below is a sample listing of codes for the fibre channel low level states and their ASCII names. The elsCode is used in the table entries to represent the low level states and the elsNames can be used for display of those codes.

Example elsNames, as would be understood by those in the art include:

"LSRJT", "ACC", "PLOGI", "FLOGI", "LOGO", "ABTX", "RCS", "RES", "RSS", "RSI", "ESTS", "ESTC", "ADVC", "RTV", "RLS", "ECHO", "TEST", "RRQ", "REC", "SRR", "PRLI", "PR LO", "SCN", "TPLS", "TPRLO", "LCLM", "GAID", "FACT", "FDACT", "NACT", "NDACT", "QoSR", "RVCS", "PDISC", "FDISC", "ADISC", "RNC", "F-REQ", "FRPLY", "RPS", "RPL", "FAN", "RSCN", "SCR", "RNFT", "CSR", "CSU", "LINIT", "LPC", "LSTS", "RTIN", "RNID", "RLIR", "LIRR", "SRL", "SBRP", "RPSC", "UNKWN"};

The corresponding elsCodes are:

0x01, 0x02, 0x03, 0x04, 0x05, 0x06, 0x07, 0x08, 0x09, 0x0A, 0x0B, 0x0C, 0x0D, 0x0E, 0x0F, 0x10, 0x11, 0x12, 0x13, 0x14, 0x20, 0x21, 0x22, 0x23, 0x24, 0x25, 0x30, 0x31, 0x32, 0x33, 0x34, 0x40, 0x41, 0x50, 0x51, 0x52, 0x53, 0x54, 0x55, 0x56, 0x57, 0x60, 0x61, 0x62, 0x63, 0x68, 0x69, 0x70, 0x71, 0x72, 0x77, 0x78, 0x79, 0x7A, 0x7B, 0x7C, 0x7D.

Again, this information can be added to the table through the last parameter of theUpdateDevInfoElt or AddDevInfoElt routines. It should be noted that the SCSI and fibre channel low level states provided above are provided by way of example and other low-level states that affect the success of a command can be recorded.

Thus, the routing device can receive a command, assign the command a Unique ID and record state information for the command in one or more tables. The state information can be associated with the Unique ID for the command in the tables. The state information can include any information that indicates the progress of a command and can include sub-state information. Each table that stores the state information for the command can correspond to a particular data transport protocol and further to a particular device on that data transport protocol.

The tables used, according to one embodiment of the present invention, are not static tables that are constructed at compile or boot time, but are allocated dynamically as they are needed. This allows for using only the amount of memory needed for the number of initiators and devices in use. A table for any given host or target device can be created the first time that a command to or from that host or target device is encountered. For a single command, multiple tables may be generated, depending on whether the command proceeds from the routing device to a target device, or is handled internally by the routing device. According to one embodiment of the present invention, if, at any time, the routing device is unable to allocate the table it needs, routing device 302 can generate an indication that there is insufficient memory to track the command. The first time this happens routing device 302 can put an entry in an event log to make sure that this event is noted for later analysis and/or debug. According to one embodiment, it is not necessary to preserve the command tracking information across reboots of the routing device. Thus, no form of non-volatile memory (flash, NVRAM, etc.) is necessary for this function. Routing device 302 can also provide the option to allow a user to clear the tables at any time.

According to one embodiment of the present invention, if a state for a command arises that may be an item of note or be a precursor to an issue, the information for the command can be placed into a locked state to preserve that information for later review. This, according to one embodiment, copies not only the state information for the command in question, but also some number of commands before it to show what may have led up to the issue. This way the user can look back at the last series of commands for a given device. Embodiments of the present invention can include rules for locking commands so that normal expected states are not locked. For example, an embodiment of the present invention can automatically lock on non-zero statuses, except for Unit Attention and possibly expected tape conditions like EOT, EOM or ILI. This way it can capture real conditions, but not fill the lock sets with normal expected states.

Figure 5A:
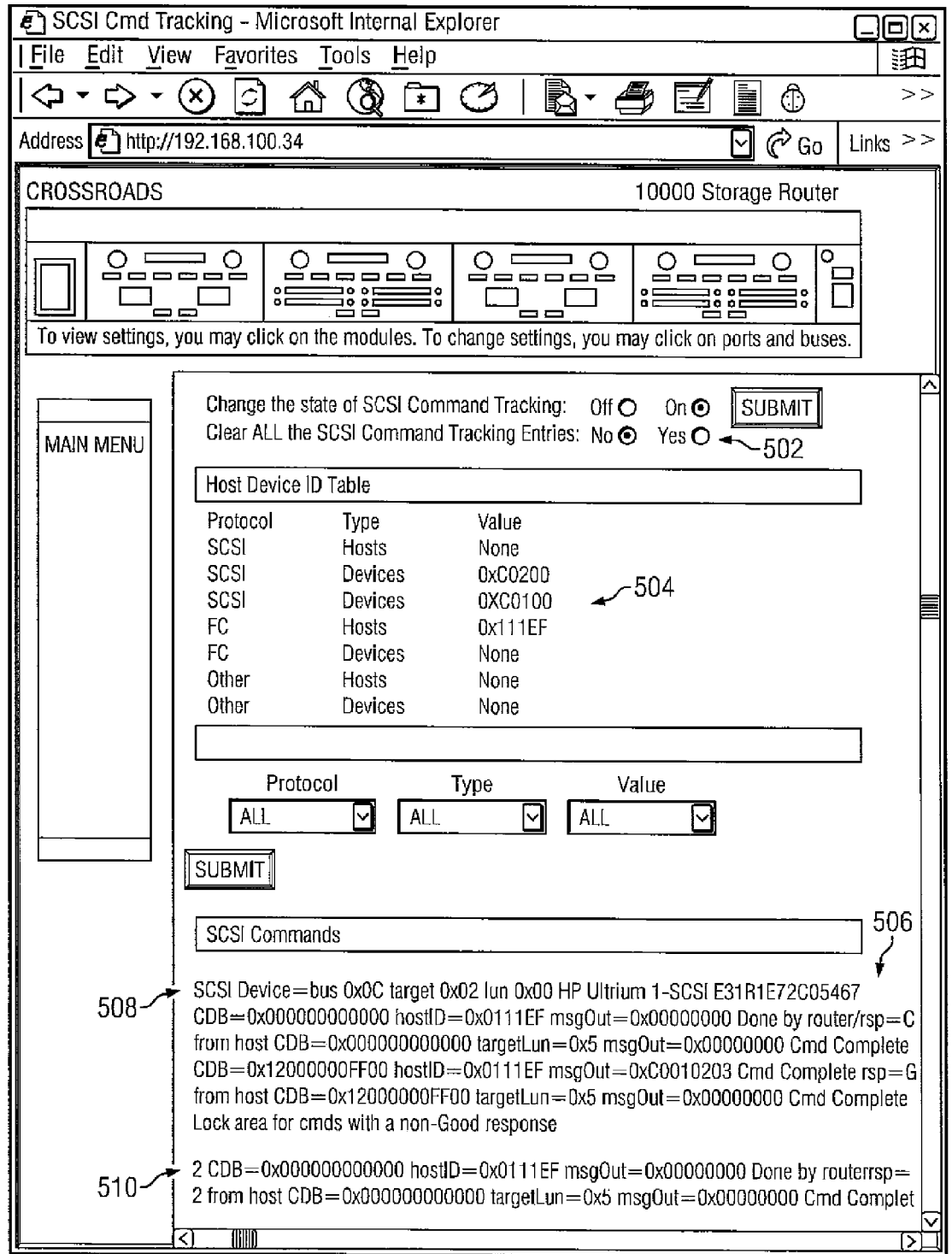
FIGS. 5A-5C are diagrammatic representations of example graphical user interfaces for displaying command tracking information.
Figure 5B:
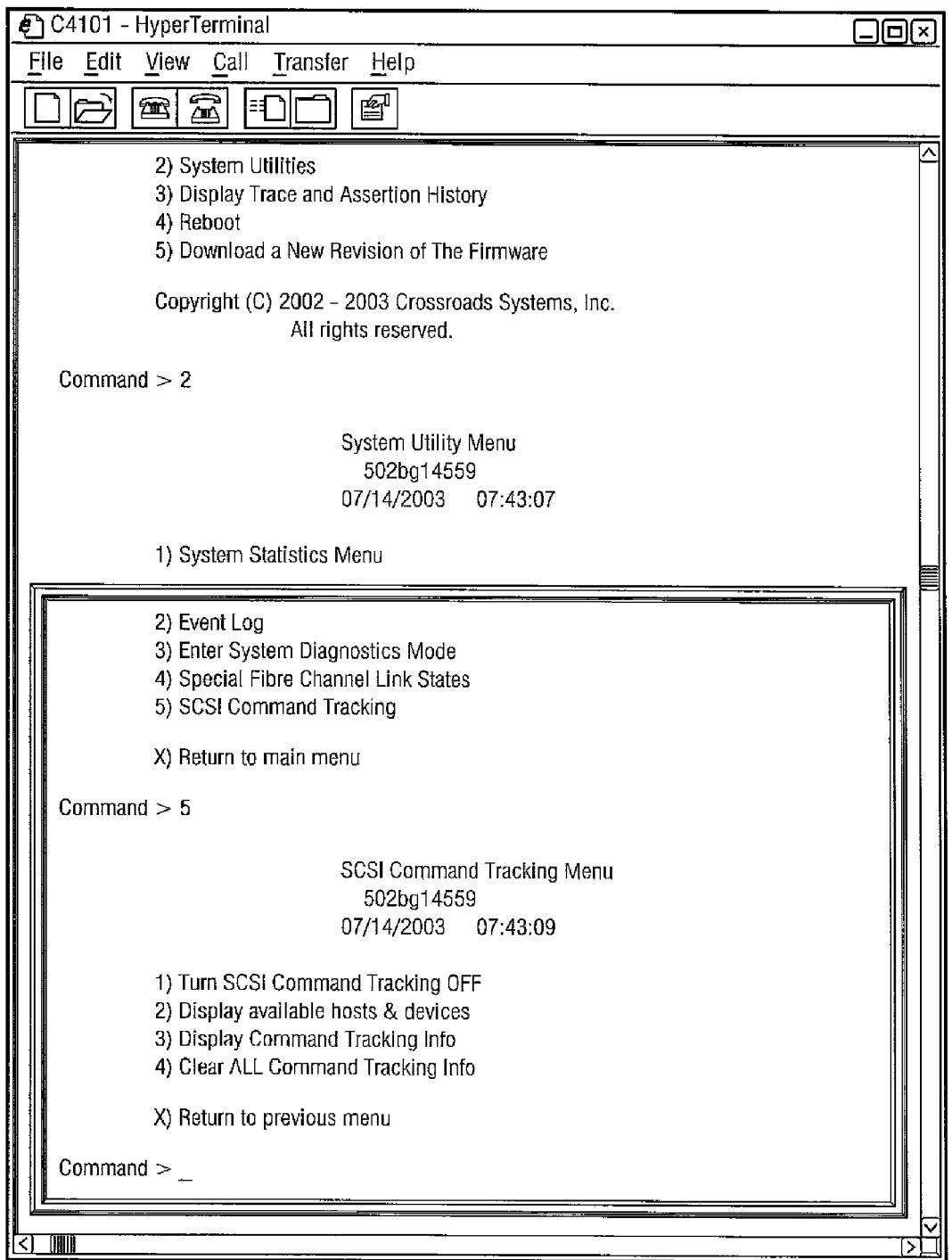
Figure 5C:
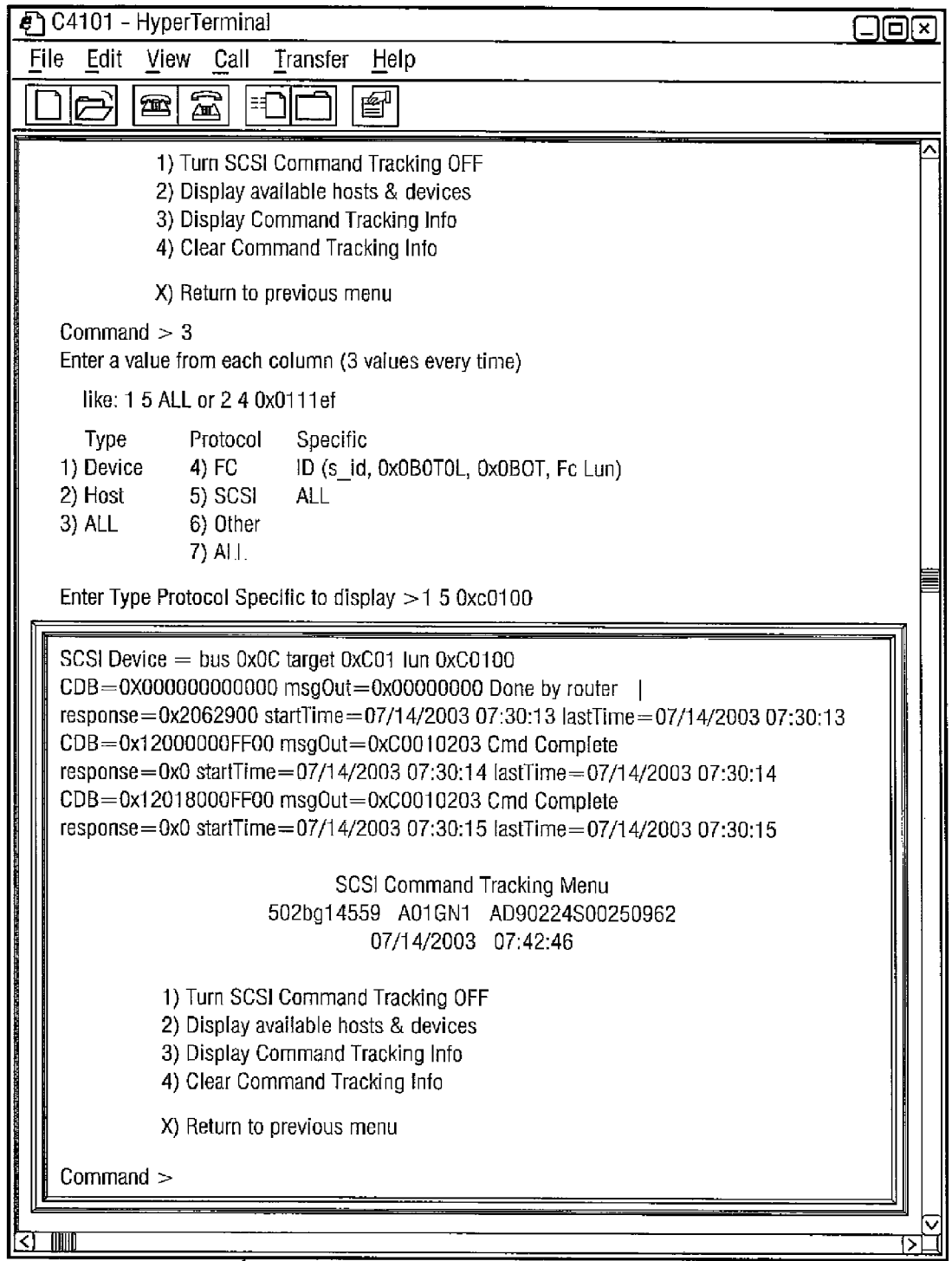

The command tracking information can be accessed by a user through, for example, a graphical user interface. FIGS. 5A-5C illustrate various embodiments of screens that can be presented to a user to display command tracking information. Presentation layer applications (e.g., HTTP applications, Async\Telnet and other applications known in the art) at the routing device can receive requests to display the command tracking information. According to one embodiment, the information may be displayed based on the initiators (e.g., hosts) or target devices. Additionally, information from the host-side and target device-side can be correlated together.

FIG. 5A is a web based interface showing command tracking information. Screen 500 is a sample output showing the ability to clear the commands in the tables (shown at 502), the host/device table showing all the initiators and targets that have been addressed since last time the tables were cleared (shown at 504) and the actual command display (shown at 506). Additional information is displayed to help the user determine the host or target device for which a set of command tracking information is being displayed (shown at 508). Additionally, the locked commands are listed after the last series of commands (shown at 510). FIGS. 5B and 5C provide example screens for a serial interface. In screen 520 of FIG.

5B a user can select option 5 to proceed to screen 530 of FIG. 5C. In the example of FIG. 5C, the user has selected to see command tracking information for devices attached by a SCSI data transport protocol.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A method of tracking commands between devices on a network comprising:
   providing a system comprising a routing device having a first controller operable to interface with a first data transport medium, a second controller operable to interface with a second data transport medium, a buffer and a processing unit coupled to the first controller, the second controller and the buffer, wherein the routing device further comprises a set of executable instructions, wherein the processing unit is operable to execute the set of instructions to perform the steps of;
   receiving a command from a first device on the first data transport medium according to a first data transport protocol, wherein the command is intended for a particular target device operating according to a second data transport protocol;
   assigning the command a unique identification; and
   recording state information for the command in one or more tables in the buffer, wherein the state information comprises state information corresponding to the first data transport protocol in a first table for the first data transport medium and state information corresponding to the second data transport protocol in a second table for the second data transport medium, wherein the state information is associated with the unique identification in the one or more tables.

2. The method of claim 1, wherein the first data transport protocol and second data transport protocols are fibre channel protocols.

3. The method of claim 1, further comprising:
   at a first protocol layer corresponding to the first data transport protocol:
      determining that a message from a host contains the command;
      generating the unique identification for the command;
      recording at least the first portion of the state information for the command in the first table with the unique identification;
      passing the unique identification and the command to another layer;
   at a second protocol layer corresponding to the second data transport protocol:
      receiving the command and unique identification; and
      recording at least the second portion of the state information in the second table with the unique identification.

4. The method of claim 3, wherein the first portion of the state information and the second portion of the state information are associated with the command using the unique identification.

5. A system comprising a routing device having a first controller operable to interface with a first data transport medium, a second controller operable to interface with a second data transport medium, a buffer and a processing unit coupled to the first controller, the second controller and the buffer, wherein the routing device further comprises a computer program product for tracking commands between devices on a network comprising a set of computer instructions stored on a computer readable storage medium, wherein said set of computer instructions comprise instructions executable by a processor to:
   assign a command received from a first device on said network according to a first data transport protocol, a unique identification, wherein the command is intended for a particular device operating according to a second data transport protocol;
   associate state information for the command with the unique identification; and
   record the state information for the command at the routing device in one or more tables in the buffer, wherein each table corresponds to a data transport protocol, wherein at least a first portion of the state information for the command corresponds to the first data transport protocol and is recorded in a first table corresponding to the first data transport medium using the unique identification and a second portion of the state information for the command corresponds to the second data transport protocol and is recorded in a second table corresponding to the second data transport medium.

6. The system of claim 5, wherein the first data transport protocol and second data transport protocol are fibre channel protocols.

7. The system of claim 5, wherein said set of computer instructions comprise a first protocol layer, a second protocol layer and a routing layer and wherein:
   the first protocol layer is configured to:
      determine that a message from a host contains the command;
      generate the unique identification for the command;
      record at least a first portion of the state information for the command in the first table;
      pass the unique identification and the command to another layer;
   the second protocol layer is configured to:
      receive the command and unique identification; and
      record at least the second portion of the state information in the second table.

8. The system of claim 7, wherein the other layer is the routing layer and wherein the routing layer is configured to:
   receive the command and unique identification from the first protocol layer; and
   pass the command and unique identification to the second protocol layer.

9. The system of claim 7, wherein the first portion of the state information and the second portion of the state information are associated with the command using the unique identification.

10. A routing device comprising:
   a first controller operable to interface with a first data transport medium operating according to a first data transport protocol;
   a second controller operable to interface with a second data transport medium operating according to a second data transport protocol;
   a buffer to provide a memory workspace for the routing device;

a processing unit connected to the first controller, the second controller and the buffer, wherein the processing unit is operable to:

assign a command a unique identification, wherein the command was received from a host coupled to the first controller and is intended for a particular target device coupled to the second controller;

associate state information for the command with the unique identification; and record the state information for the command in one or more tables in the buffer using the unique identification, wherein at least a first portion of the state information for the command corresponds to the first data transport protocol and is recorded in a first table corresponding to the first data transport medium and a second portion of the state information for the command corresponds to the second data transport protocol and is recorded in a second table corresponding to the second data transport medium.

11. The routing device of claim 10, wherein the processing unit is further operable to implement a first protocol layer, a second protocol layer and a routing layer and wherein:

the first protocol layer is configured to:
determine that a message from a host contains the command;
generate the unique identification for the command;
record at least the first portion of the state information for the command in the first table with the unique identification; and
pass the unique identification and the command to another layer; and the second protocol layer is configured to:
receive the command and unique identification; and
record at least the second portion of the state information in the second table with the unique identification.

12. The routing device of claim 11, wherein the other layer is the routing layer and wherein the routing layer is configured to:
receive the command and unique identification from the first protocol layer; and
pass the command and unique identification to the second protocol layer.

13. The routing device of claim 11, wherein the first portion of the state information and the second portion of the state information are associated with the command using the unique identification.

14. A system comprising a routing device having a first controller operable to interface with a first data transport medium, a second controller operable to interface with a second data transport medium, a buffer and a processing unit coupled to the first controller, the second controller and the buffer, wherein the routing device further comprises a computer program product comprising a set of computer instructions stored on a computer readable storage medium, the computer instructions comprising instructions executable by a processor to:

receive a command from an initiator over a network;

assign the command received from the initiator according to a first data transport protocol a unique identification at the routing device, wherein the command is intended for a target device operating according to a second data transport protocol;

record a first portion of state information for the command in a first table at the routing device wherein the first portion of the state information corresponds to a first data transport protocol and is associated with an initiator identification and the unique identification in the first table; and record a second portion of the state information for the command in a second table at the routing device, wherein the second portion of the state information corresponds to a second data transport protocol and is associated with a target identification and the unique identification in the second table.

15. The system of claim 14, wherein the set of computer instructions further comprise instructions executable to:
determine that a state of the command has changed; and
update the first table.

16. The system of claim 14, wherein the set of computer instructions further comprise instructions executable to:
determine that a state of the command has changed; and
update the second table.

17. The system of claim 14, wherein the set of computer instructions further comprise instructions executable to update the first table and the second table with router generated state information.

* * * * *